(12) United States Patent
Chang et al.

(10) Patent No.: US 6,797,299 B2
(45) Date of Patent: Sep. 28, 2004

(54) DESALTING METHOD FOR NUTRITIONAL SUPPLEMENTS WITH ANIMAL PROTEIN

(75) Inventors: Che-Lang Chang, Taipei (TW); Shyh-Dan Lin, Tainan (TW); Whae-Ling Chuang, Taipei (TW); Chien-Hong Chen, San Chung (TW)

(73) Assignee: Great Wall Enterprise Co., Ltd., Tainan Hsien (TW)

( * ) Notice: Subject to any disclaimer, the term of this patent is extended or adjusted under 35 U.S.C. 154(b) by 377 days.

(21) Appl. No.: 10/062,530

(22) Filed: Feb. 5, 2002

(65) Prior Publication Data

US 2003/0148005 A1 Aug. 7, 2003

(51) Int. Cl.$^7$ ................................. A23J 3/04
(52) U.S. Cl. .................. 426/271; 426/804; 426/656; 426/648
(58) Field of Search ................... 426/271, 804, 426/656, 648, 437

(56) References Cited

U.S. PATENT DOCUMENTS

| | | | |
|---|---|---|---|
| 4,091,003 A | * | 5/1978 | Bosund et al. ............... 530/416 |
| 4,276,140 A | * | 6/1981 | Jain .......................... 204/527 |
| 5,427,813 A | * | 6/1995 | Suido et al. ................ 426/583 |
| 5,976,597 A | * | 11/1999 | Takada et al. .............. 426/491 |

FOREIGN PATENT DOCUMENTS

| | | | | |
|---|---|---|---|---|
| GB | 1347933 | * | 2/1974 | ............ C07G/7/00 |

* cited by examiner

*Primary Examiner*—Keith Hendricks
(74) *Attorney, Agent, or Firm*—Rosenberg, Klein & Lee

(57) ABSTRACT

A method for desalting nutritional supplements with animal protein, and a method for regenerating the ion exchange resin used in the desalting process are provided. The desalting method includes: (1) setting up a first, and a second columns containing strongly acidic cation exchange resin, and strongly basic anion exchange resin respectively; (2) passing the nutritional supplement, predetermined temperature and volume, through the first column to exchange sodium ions in the supplement for the cations, and thruogh the second column to exchange the anions; and (3) concentrating the nutritional supplement. The regenerating method includes: (1) passing water through first and second columns in a opposite direciton of the supplement (2) passing sodium hydroxide solution through the first column; (3) passing water, and hydrochloric acid through the first column in the original direction of the supplement separately; (4) passing water through the first column in the original, and the opposite direction separately; (5) passing hydrochloric acid thruogh the second column; (6) passing water, and sodium hydroxide solution through the second column in the original direction separately; and, (7) passing water through the second column in both of the directions separately.

8 Claims, 2 Drawing Sheets

DESALTING METHOD FOR NUTRITIONAL SUPPLEMENTS WITH ANIMAL PROTEIN

BACKGROUND OF THE INVENTION

The present invention relates to a desalting method for nutritional supplements with animal protein, and a regenerating method for the ion exchange resin used in the desalting method, whereby the nutritional supplement can be provided in low salt with relatively low loss of animal protein and the ion exchange resin can be regenerated again after the desalting process.

Chinese have a traditional idea that food is better than medicine to nourish the bodies. Though most people can get a lot of nutrition from foods provided in the regular meals at the present days, they, especially Chinese and those after operations, illness, and childbirth, like to take nutritional supplements between the regular meals for increasing their energy, vigor, and building up their resistance to disease.

In the past, people would stew meat together with herbs to prepare nutritional supplement by themselves. However, most modern people usually don't have time to do the preparation of such nutritional supplements by themselves because they are busy due to work and because the preparation and stewing of the nutritional supplements takes a long time. Therefore, canned nutritional supplements have been made available in the market by food companies for customers to have them easily. Such canned nutritional supplements mainly contains animal protein, and are usually provided in a condensed form such that same can nourish the takers in an efficient way.

However, such nutritional supplements are found to have a disadvantage that they contain relatively much salt that is not healthful for the takers, especially those who suffer from high blood pressure, and illness on kidney, heart, and cardiovascular.

Therefore, many food industries have been focused much attention on developing low-salt nutritional supplements that most people can take. One method for desalting the nutritional supplements is by means of ion exchange. The ion exchange resin used in such ion exchange method would also absorb some part of the animal protein, thus reducing the main nutrients of the food supplements.

SUMMARY OF THE INVENTION

Therefore, it is a main object of the present invention to provide an ion-exchange desalting method for nutritional supplements with animal protein such that the animal protein loss in the desalting process can be reduced to an ideal degree.

It is another object of the present invention to provide a regenerating method for the ion exchange resin used in the desalting method such that the ion exchange resin can be used again.

The ion-exchange method for desalting nutritional supplements includes:

(1) stewing animal tissues under high pressure to make the semi-product of the nutritional supplement;

(2) passing the semi-product in a first direction through a first column, and a second column in sequence, which contain resin with strongly acidic cation, and resin with strongly basic anion respectively; thus, the cation (including $Na^+$) in the semi-products are exchanged for the hydrogen ions ($H^+$) in the resin of the first column, while the anions contained in the semi-products are exchanged for a hydroxide ions ($OH^-$) in the resin of the second column;

(3) Concentrating the nutritional supplement, of which most of the salt ingredient is removed.

The regenerating method for the ion exchange resin used in the above desalting process includes:

(1) passing water through both columns to wash out the protein residues in a second direction opposite the first one; precipitating and recovering the protein residues;

(2) passing NaOH solution through the first column containing the resin with cations; passing water and HCL solution through the cation exchanger in the first column in the first direction separately;

(3) passing water through the cation exchanger in the first column in the first direction, and then in the second direction;

(4) passing HCL solution through the second column containing the resin with anions; passing water, and NaOH solutions, in the first direction, through the anion exchanger in the second column separately;

(5) passing water through the resin in the second column in both of the first and the second directions separately. Thus, the resin in both of the columns can be used again.

BRIEF DESCRIPTION OF THE DRAWINGS

The present invention will be better understood by reference to the accompanying drawings, wherein.

DETAILED DESCRIPTION OF THE PREFERRED EMBODIMENT

Figure 1:
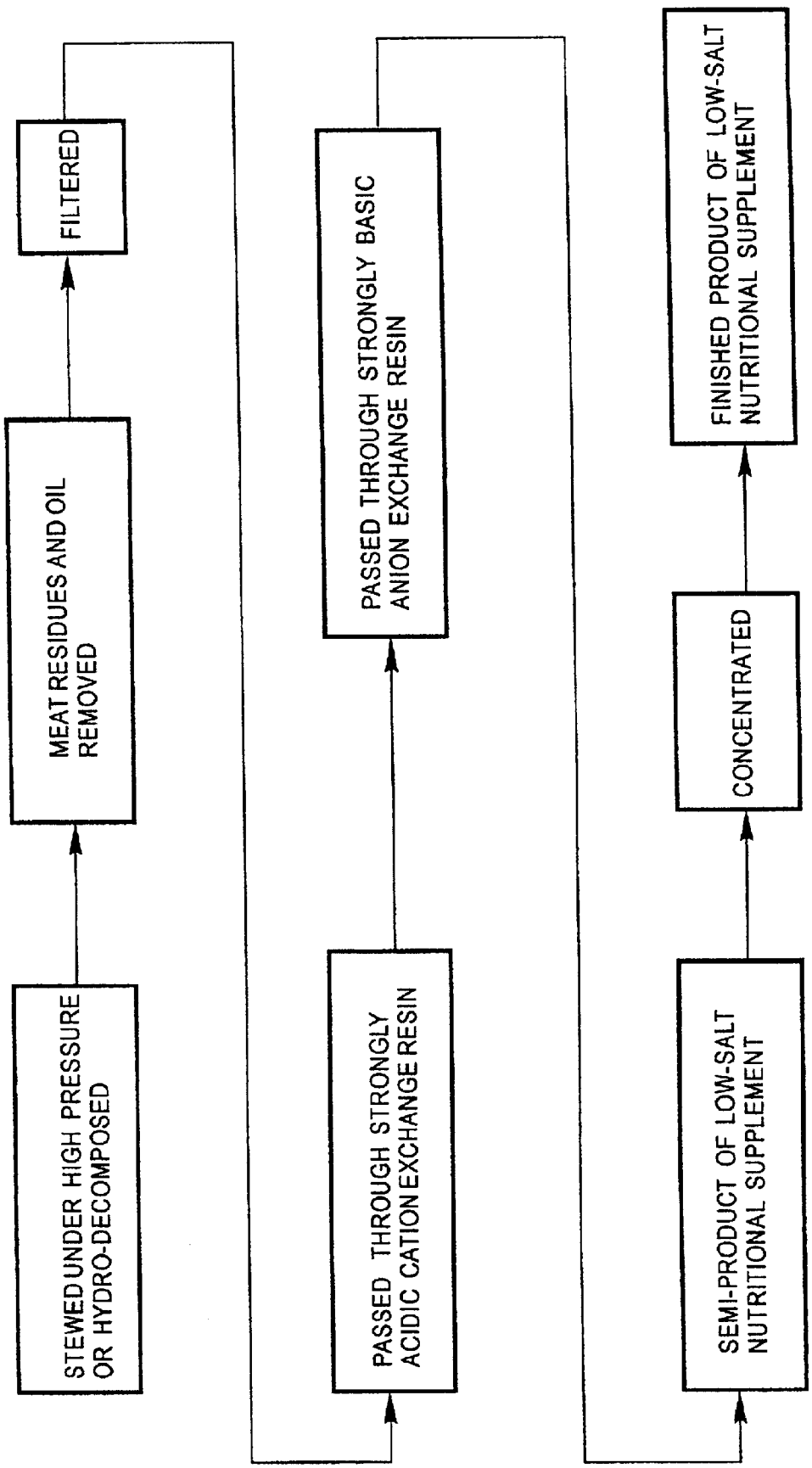
FIG. 1 is a flow chart of the method for desalting nutritional supplements according to the present invention; and, FIG. 2 is a flow chart of the method for regenerating the ion exchange resin used in the desalting method in the present invention.

Referring to FIG. 1, a method for desalting nutritional supplements with animal protein according to the present invention includes the following actions:

Firstly, the animal tissues are stowed in water, and hydro-decomposed under high pressure after the same have been processed at the beginning to become a semi-product which contains the nutrients of the animal tissues; the ration of the weight of the animal tissues to that of the water is 1:1.

Secondly, oil and meat residues are removed from the semi-products to make the same contain no fat.

Thirdly, the liquid semi-product is filtered to get rid of all impurities.

Fourthly, the liquid semi-product is passed, in a first direction (downward) through an ion exchange, the speed is controlled at 1.1 to 1.3 times the volume of the resin (bed volume) of the ion exchange per minute (SV about 65~80); the temperature is controlled between 25° C. and 55° C.; the ion exchange device includes a first, and a second columns, containing strongly acidic cation exchanger and strongly basic anion exchanger respectively; the cations in the first column are $H^+$, while the anions in the second column are $OH^-$: first, the liquid semi-product is passed through the first column containing the strong-acid ion-exchange resin with cations such that cations contained therein, including $Na^+$, are exchange for the cations, $H^+$, of the ion-exchange resin; the total amount of the semi-product passed through the cation exchange resin is controlled between 7 and 10 times the volume of the anion exchange resin; then, the semi-product is passed through the second column containing the strong basic anion exchange resin for anions contained therein to be exchange for the anions, OH⁻, of the ion exchange resin.

hus, the semi-product of the nutritional supplement low salt product with most salt being removed therefrom, and the pH value is above 5.85.

Referring to tables 1, and 2, which show the analysis of the ingredients of nutritional supplement semi-products (chicken soup and beef soup) before the above desalting process, and after respectively:

TABLE 1

Ingredient analysis of the semi-products before the ion exchange process

|  | CHICKEN SOUP BEFORE THE ION EXCHANGE PROCESS | BEEF SOUP BEFORE THE ION EXCHANGE PROCESS |
|---|---|---|
| Na | 550 ppm | 418 ppm |
| K | 1050 ppm | 1276 ppm |
| CI | 1290 ppm | 542 ppm |
| P | 392 ppm | 73 ppm |
| Protein | 4.6% | 8.3% |
| Ash | 0.38% | No test |
| Brix° | 6 | 7.2 |
| pH | 5.9 | 5.87 |

TABLE 2

Ingredient analysis of the semi-products after the ion exchange process

|  | CHICKEN SOUP AFTER THE ION EXCHANGE PROCESS | BEEF SOUP AFTER THE ION EXCHANGE PROCESS |
|---|---|---|
| Na | 5.8 ppm | <190 ppm |
| K | 6.30 ppm | <10 ppm |
| CI | N.D. | <230 ppm |
| P | 33.8 ppm | 1.6 ppm |
| Protein | 3.7% | 4.2% |
| Ash | 0.01% | No test |
| Brix° | 5.0 | 5.2 |
| pH | 6.31 | 6.11 |

From the comparison of table one with table two, we can see that the sodium contents of both the nutritional supplement semi-products are reduced by over 98% in chicken soup and 54% in beef soup respectively with the ion exchange process.

The semi-products of the nutritional supplements are concentrated to become clear golden finished products.

Figure 2:
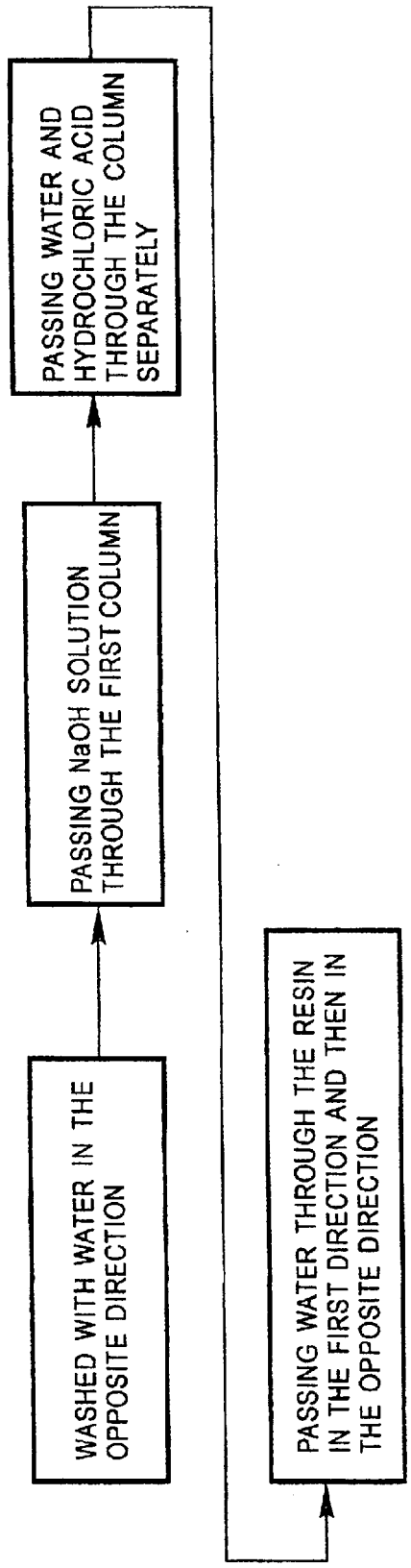
Figure 2:
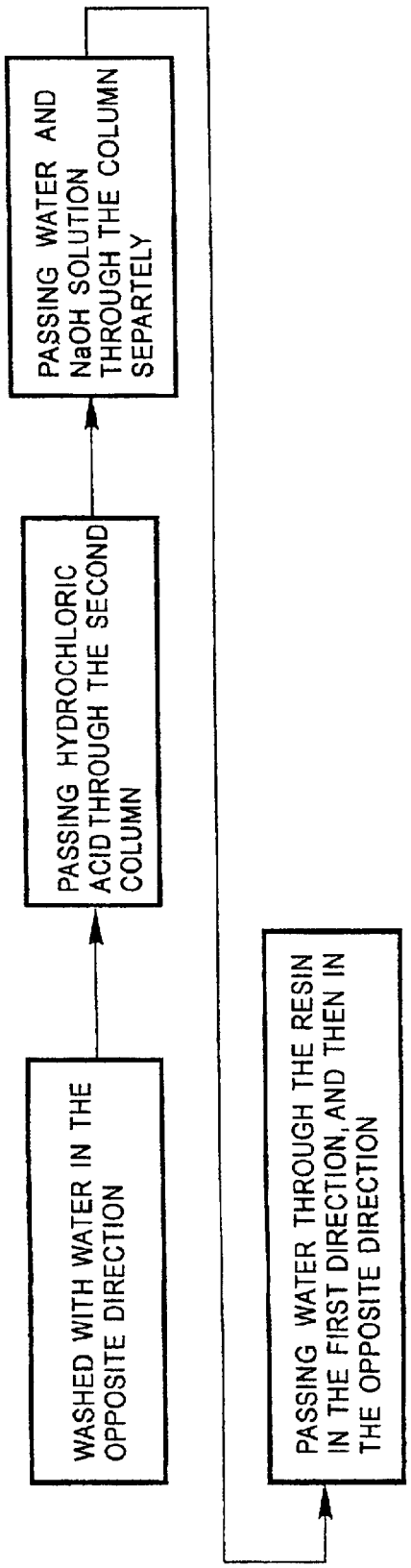

Referring to FIG. 2, a regenerating method for the ion exchange resin used in the above desalting process includes the following action:

Firstly, water with a volume ten times the bed volume of the ion exchange resin is passed through the first and the second columns in a second direction (upward) opposite the first direction respectively so as to wash out the protein residues; then, the protein residues are precipitated and recovered.

Secondly, sodium hydroxide (NaOH) solution, 1.5N in concentration and two times the volume of the resin in volume, is passed through the first column containing the ion exchange resin with cations at a speed of ¹/₁₀ of the volume of the resin per minute.

Thirdly, water with a volume four times the volume of the resin and hydrochloric acid (HCL), 2 N in concentration and five times the volume of the resin in volume, are passed through the first column in the first direction separately.

Fourthly, water of two times the volume of the resin is passed through the first column in the first direction, and then water of ten times the volume of the resin is passed through the first column in the second direction.

Fifth, hydrochloric acid, two times the volume of the resin in volume and 2N in concentration, is passed through the second column containing the ion exchange resin with anions at a speed of ¹/₁₀ of the volume of the resin per minute.

Sixthly, water of four times the volume of the resin, and sodium hydroxide solution, 1.5 N in concentration and five times the volume of the resin in volume, are passed through the second column in the first direction separately.

Finally, water of two times the volume of the resin is passed through the second column in the first direction; and then water of ten times the volume of the resin is passed through the second column in the second direction.

Thus, the ion exchange resin contained in both of the columns can be regenerated again. In addition, the hydrochloric acid, which was just passed through the first column, can be collected to be used in the second column at the next time, while the sodium hydroxide solution, which was just passed through the second column, can be collected to be used in the first column at the next time.

It is important to monitor the flow of the nutritional supplement semi-products through the columns containing the resin and maintain a high-quality ion exchange resin because the pH value and quality of the finished products depends on them.

Furthermore, referring to table three, when conventional canned chicken extract, which is not desalted, is passed through the ion exchange resin of the present invention at a speed of 1.2 times the volume of the resin per minute, and then concentrated to Brix® 12, the reduction of the Na⁺ Content is 84.9%, and the clear golden look is maintained.

TABLE 3

Analysis of the ingredients of the conventional nutritional supplement before the desalting method, and after:

|  | CHICKEN EXTRACT BEFORE DE-SALTING | CHICKEN EXTRACT AFTER DE-SALTING |
|---|---|---|
| Na | 883 ppm | 133 ppm |
| K | 1010 ppm | 90.6 ppm |
| P | 838 ppm | 131 ppm |
| Ca | 13.3 ppm | 13.1 ppm |
| Mg | 68.6 ppm | 59.3 ppm |
| Brix° | 12 | 12 |
| pH | 5.95 | 6.4 |

Some attention has been focused on developing methods for desalting whey products but none for nutritional supplements with animal protein. The method for desalting nutritional supplements allows the clear look and the original flavor to be maintained, and allows those who suffer from high blood pressure, kidney illness, cardiovascular disease, and young children to take.

What is claimed is:

1. A method for desalting nutritional supplements with animal protein, comprising actions of:

(1) stewing animal tissues in water under high pressure for same to become a semi-product;

(2) removing oil and meat residues from said semi-product;

(3) filtering said semi-product;

(4) setting up a first, and a second columns containing exchange resin with strongly acidic cations, and exchange resin with strongly basic anion respectively;

(5) passing said filtered semi-product through said strongly acidic cation exchange resin in said first column so as to exchange cations including $Na^+$ of said semi-product for said cations ($H^+$) in said strongly acidic cation exchange resin;

(6) passing said semi-product through said strongly basic anion exchange resin in said second column so as to exchange anions of said semi-product for said anions ($OH^-$) in said strongly basic anion exchange resin; and, (7) concentrating said semi-product for same to become a finished product.

2. The method for desalting nutritional supplements with animal protein as claimed in claim 1, wherein said animal tissues are hydro-decomposed with water to become said semi-product.

3. The method for desalting nutritional supplement with animal protein as claimed in claim 1 or 2, wherein a ration of a weight of said animal tissues to a weight of said water is 1:1.

4. The method for desalting nutritional supplements with animal protein as claimed in claim 1, wherein said semi-product is controlled between 25 and 55° C. in respective of temperature when being passed through said columns containing said ion exchange resins.

5. The method for desalting nutritional supplements with animal protein as claimed in claim 1, wherein said semi-product is passed through said ion-exchange resin at a speed between 1.1 and 1.3 times a volume of said ion exchange resin per minute.

6. The method for desalting nutritional supplements with animal protein as claimed in claim 1, wherein said cations contained in said first column are in $H^+$ form.

7. The method for desalting nutritional supplements with animal protein as claimed in claim 1, wherein said anions contained in said second column are in $OH^-$ form.

8. The method for desalting nutritional supplements with animal protein as claimed in claim 1, wherein said semi-product is passed through said ion exchange resin at an amount between 7 and 10 times a volume of said ion exchange resin so as to control a pH value of said semi-product after said ion exchange actions above 5.85.

* * * * *